(12) United States Patent
Shiono et al.

(10) Patent No.: US 7,038,978 B2
(45) Date of Patent: May 2, 2006

(54) OPTICAL INFORMATION RECORDING AND REPRODUCING APPARATUS FOR RECORDING INFORMATION BITS INTO AN OPTICAL DISK IN A THREE DIMENSIONAL ARRANGEMENT

(75) Inventors: Teruhiro Shiono, Osaka (JP); Hiroaki Yamamoto, Hyogo (JP); Tetsuo Saimi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 433 days.

(21) Appl. No.: 09/988,788

(22) Filed: Nov. 20, 2001

(65) Prior Publication Data

US 2002/0060959 A1 May 23, 2002

(30) Foreign Application Priority Data

Nov. 21, 2000 (JP) .............................. 2000-354486

(51) Int. Cl.
*G11B 7/095* (2006.01)

(52) U.S. Cl. ..................... 369/44.24; 369/118; 369/94

(58) Field of Classification Search ............. 369/44.24, 369/118, 94, 112.24, 275.5, 283; 365/10, 365/234

See application file for complete search history.

(56) References Cited

U.S. PATENT DOCUMENTS

| | | | | |
|---|---|---|---|---|
| 4,125,860 A | * | 11/1978 | Ishii et al. ............. | 369/109.01 |
| 4,793,696 A | * | 12/1988 | Suh .............................. | 359/223 |
| 5,080,947 A | * | 1/1992 | Yamada et al. ............. | 369/288 |
| 5,097,464 A | * | 3/1992 | Nishiuchi et al. ...... | 369/112.29 |
| 5,258,969 A | * | 11/1993 | Refregier et al. ........... | 369/100 |
| 5,487,060 A | * | 1/1996 | Rosen et al. ................ | 369/118 |
| 5,532,998 A | * | 7/1996 | Durham ...................... | 369/116 |
| 5,661,604 A | * | 8/1997 | Kuba .......................... | 359/637 |
| 5,734,632 A | * | 3/1998 | Ito et al. ................... | 369/44.23 |
| 5,748,601 A | * | 5/1998 | Takahashi ................. | 369/44.23 |
| 6,020,985 A | * | 2/2000 | McLeod et al. .............. | 359/22 |
| 6,072,763 A | * | 6/2000 | Takahashi ................... | 369/118 |
| 6,169,722 B1 | * | 1/2001 | Kikukawa et al. ....... | 369/275.4 |

(Continued)

FOREIGN PATENT DOCUMENTS

JP 56156941 A * 12/1981

(Continued)

OTHER PUBLICATIONS

English Translation of JP 06028672 A.*

*Primary Examiner*—Brian E. Miller
*Assistant Examiner*—Peter Vincent Agustin
(74) *Attorney, Agent, or Firm*—Wenderoth, Lind & Ponack, L.L.P.

(57) ABSTRACT

The optical information recording and reproducing apparatus includes a light source for emitting a light beam, an objective lens for converging the light beam emitted from the light source to an information recording medium, and a light detector for detecting the light beam reflected from the information recording medium. The information bits are recorded into a recording member of the information recording medium in a three-dimensional arrangement by using a change in optical constant of the recording member. Furthermore, a thickness of the recording member is larger than a wavelength of the light beam and the information bits are sequentially recorded into the recording member in a three-dimensional arrangement in such an order that a converging light beam from the objective lens does not pass through information bits that have already been recorded.

31 Claims, 8 Drawing Sheets

U.S. PATENT DOCUMENTS

| | | | |
|---|---|---|---|
| 6,178,151 B1 * | 1/2001 | Hino et al. | 369/118 |
| 6,212,148 B1 * | 4/2001 | Hesselink et al. | 369/103 |
| 6,292,442 B1 * | 9/2001 | Kasono | 369/44.23 |
| 6,552,985 B1 * | 4/2003 | Wierenga | 369/53.22 |

FOREIGN PATENT DOCUMENTS

| | | |
|---|---|---|
| JP | 6-28672 | 2/1994 |
| JP | 06028672 A * | 2/1994 |

* cited by examiner

OPTICAL INFORMATION RECORDING AND REPRODUCING APPARATUS FOR RECORDING INFORMATION BITS INTO AN OPTICAL DISK IN A THREE DIMENSIONAL ARRANGEMENT

BACKGROUND OF THE INVENTION

1. Field of the Invention

The present invention relates to an optical information recording and reproducing apparatus for recording information bits in a three-dimensional arrangement, and in particular, to the apparatus capable of recording information bits with good performance.

2. Related Art

Figure 8:
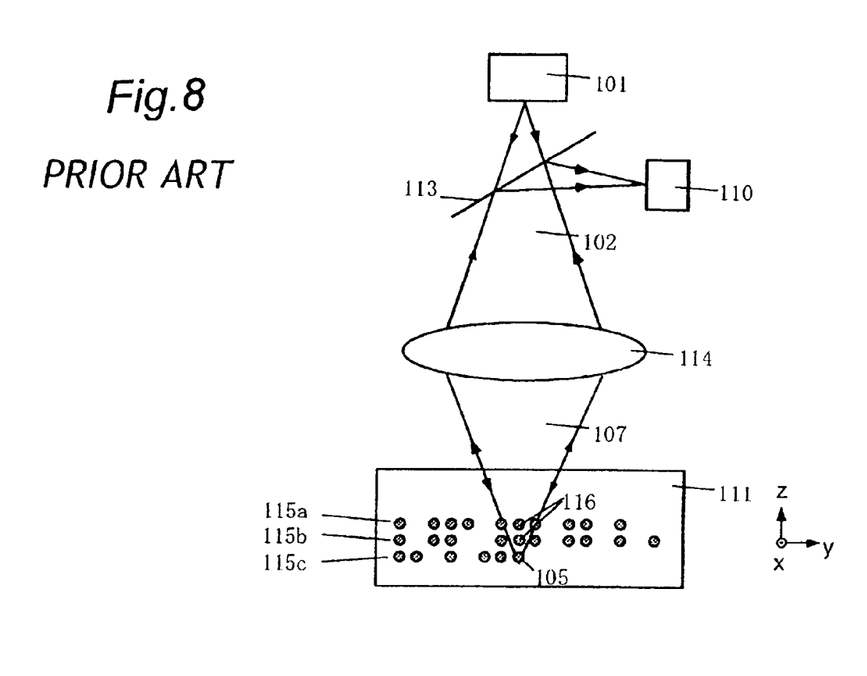
FIG. 8 is a view showing an optical information recording/reproducing apparatus of the prior art.

A conventional optical information recording/reproducing apparatus which records information bits in a three-dimensional arrangement is disclosed in Japanese Patent Laid-Open Publication No. 6-28672. The conventional optical information recording/reproducing apparatus is shown in FIG. 8. In the information recording method employed in this apparatus, a light beam 102 emitted from a light source 101 is incident to an information recording medium 111 formed of a material of a member ("a recording member") to be recorded with information bits, such as a photopolymer, having a thickness larger than the wavelength of the light beam by means of an objective lens 114 (a converging light beam 107), and thus a converging point is recorded as an information bit 105. The information bit results from a change in the refractive index or the like, and the size of which is generally larger than the wavelength of the light beam in any of the x, y and z directions.

Furthermore, it is possible to reproduce a signal by converging a light beam with low power on this information bit 105 and detecting the converging light beam 107 at a light detector 110 via the objective lens 114 and a beam splitter 113. In order to increase the information capacity, as shown in the same drawing, information bits 105 are recorded in the information recording medium 111 in a three-dimensional arrangement in the direction of the optical axis (z direction) of the objective lens 114.

The inventors of the present invention found that in the conventional optical information recording/reproducing apparatus which records information bits in a three-dimensional arrangement, however, during recording of information, when the converging light beam 107 from the objective lens passes through information bits 116 that have been already recorded, an aberration occurs in the converging light beam 107 under the influence of the information bits 116, which renders the problem that the light beam becomes difficult to converge to the focus point and the information bit 105 that is to be recorded become blurred. It is considered that the information bits 116 which are thicker than the wavelength of the light beam cause the light to be refracted mainly in the region of the information bits 116 and thus the aberration occurs.

SUMMARY OF THE INVENTION

The present invention is directed to solve the aforementioned problems in the prior art, and has a purpose to provide an optical information recording and reproducing apparatus for recording information bits in a three-dimensional arrangement, and particularly to an optical information recording and reproducing apparatus capable of recording information bits in good condition.

In order to solve the aforementioned problems, an optical information recording and reproducing apparatus according to the present invention has the following configurations.

In the first aspect of the invention, an optical information recording and reproducing apparatus for recording information bits into an information recording medium having a recording member into which information bits are recorded in a three-dimensional arrangement by changing an optical constant of the recording member of the recording medium, comprises a light source that emits a light beam, an objective lens that converges the light beam emitted from the light source to an information recording medium, and a light detector that detects the light beam from the information recording medium. A thickness of the recording member is larger than a wavelength of the light beam. The information bits are sequentially recorded into the recording member in a three-dimensional arrangement such that a converging light beam from the objective lens does not pass through information bits that have already been recorded.

In the apparatus, the information bits may be sequentially recorded from the farthest points from the objective lens in the recording member.

Furthermore, the objective lens may comprise a lens of which numerical aperture is more than or equal to 0.7. Pinholes may be disposed in an optical path including the objective lens and the light detector. Thus the light beam from the information recording medium is detected by the light detector after passing through the pinholes.

Furthermore, the apparatus may comprise a focus/track error signal detecting optical element which is an optical splitting element and disposed in an optical path including the objective lens and the light detector, and a pinhole array having a plurality of pinholes and disposed in the optical path. In this case, the light beam from the information recording medium is split into a plurality of light beams by means of the focus/track error signal detecting optical element, and the plurality of light beams are detected by the light detector after passing through corresponding pinholes of the pinhole array.

Furthermore, the apparatus may further comprise a focus/track error signal detecting optical element disposed in an optical path including the objective lens and the light detector, and a pinhole array having a plurality of pinholes and disposed on the optical path. In this case, the light beam from the information recording medium is split into a plurality of light beams by means of the focus/track error signal detecting optical element, and the light beams corresponding to track error signals are detected by the light detector after passing through pinholes of the pinhole array.

The wavelength λ of the light beam emitted from the light source substantially may be in a range satisfying $0.35 \mu m \leq \lambda \leq 0.45 \mu m$, and the optical system including the objective lens may be configured to be achromatic.

Furthermore, the apparatus may further comprise a spherical aberration correcting element disposed in an optical path including the light source and the objective lens. The spherical aberration correcting element controls an amount of spherical aberration in accordance with a recording depth of the information bits to be recorded into the recording member.

The optical constant may be a refractive index. The amount of the change in refractive index may be more than or equal to 0.005.

The information recording medium may comprise only a single recording member. Alternately, the information recording medium may comprise a recording member and a substrate. Alternately, the information recording medium may be configured by a recording member sandwiched between a substrate and a protecting member.

The light detector can comprise an avalanche photodiode.

The apparatus may further comprise a condenser lens disposed on one side of the information recording medium opposite to the objective lens. The condenser lens converges the light beam from the information recording medium to the light detector to detect the light beam.

A focus position of the objective lens may be controlled with reference to an interface of the recording member of the recording medium.

In a second aspect of the invention, an optical information recording and reproducing apparatus for recording information bits into an information recording medium having a recording member into which information bits are recorded in a three-dimensional arrangement by changing a refractive index of the recording member of the recording medium, comprises a light source that emits a light beam, an objective lens that converges the light beam emitted from the light source to an information recording medium, and a light detector that detects a light beam from the information recording medium. A thickness of the recording member is larger than a wavelength of the light beam. Amount of the change in refractive index is less than or equal to 0.02. The information bits are recorded sequentially into the recording member in a three-dimensional arrangement such that the number of rows of information bits which have been already recorded in the direction of optical axis is not more than 4.

DETAILED DESCRIPTION OF THE INVENTION

First Embodiment

First, an optical information recording/reproducing apparatus of the first embodiment of the present invention will be described in detail with reference to FIGS. 1 to 5, taking coordinate axes as shown in the drawings.

Figure 1:
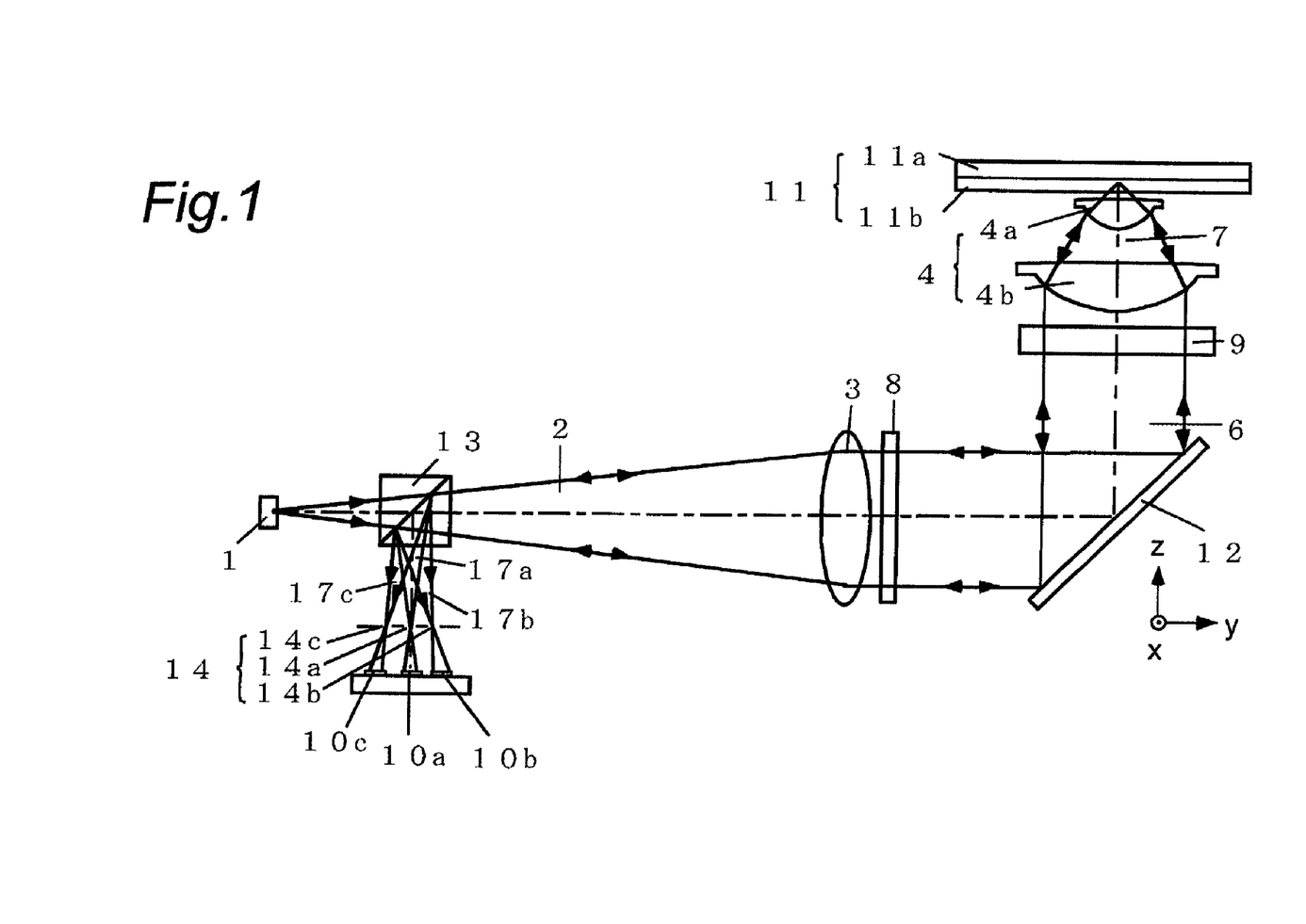
FIG. 1 is a side view showing a basic configuration of an optical head of an optical information recording and reproducing apparatus (recording/reproducing apparatus) in the first embodiment of the present invention, in which a light transmission path is also shown.
Figure 2:
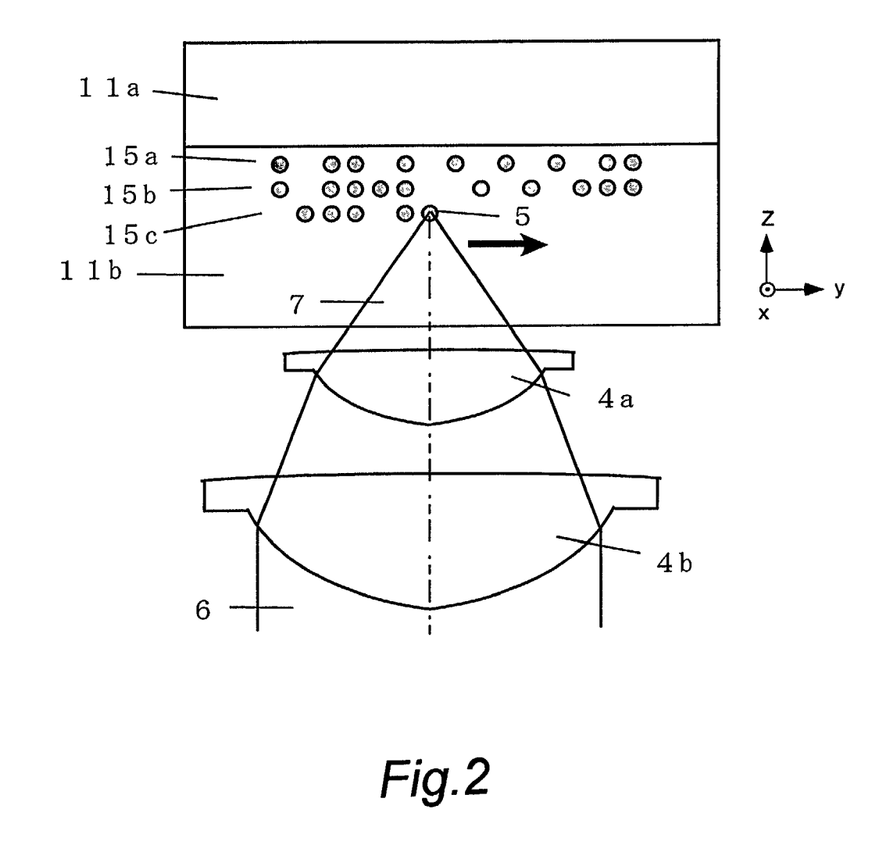
FIG. 2 is a diagram showing a manner of recording a signal on an information recording medium by the recording/reproducing apparatus of the first embodiment of the present invention.
Figure 5:
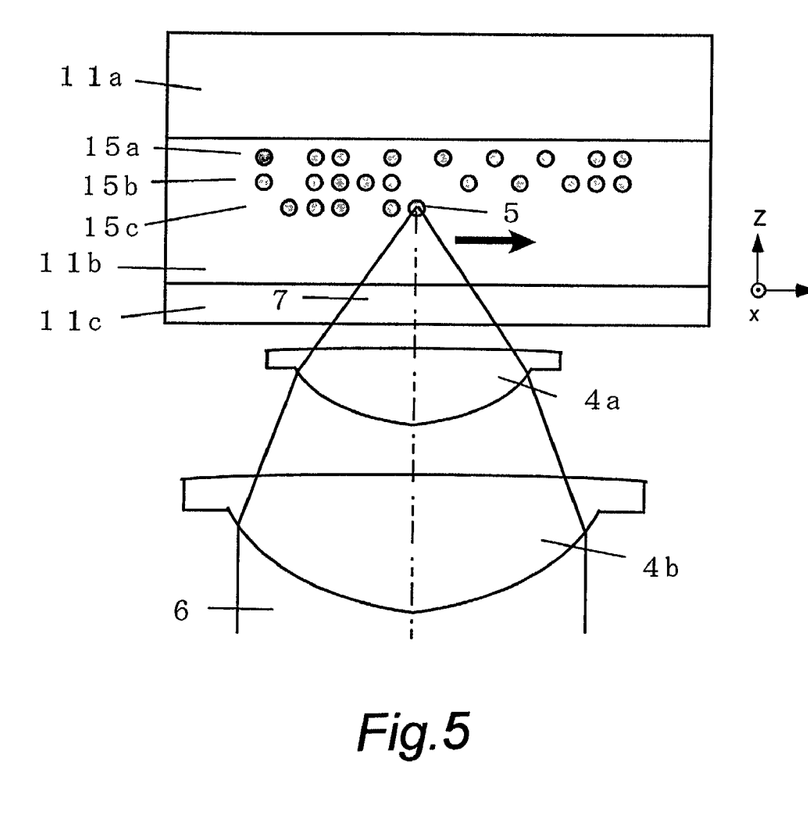
FIG. 5 is a diagram showing a manner of recording a signal on an information recording medium with another configuration by the recording/reproducing apparatus of the first embodiment of the present invention.

FIG. 1 is a side view showing a basic configuration of an optical head of an optical information recording/reproducing apparatus in the first embodiment of the present invention, in which a light transmission path is also shown. FIG. 2 is a diagram showing a manner of recording a signal on an information recording medium by the recording/reproducing apparatus of this embodiment. FIGS. 3A to 3C and 4A to 4D are diagrams of light beam trace for various magnitudes of refractive index of information bit to be recorded on the information recording medium by the recording/reproducing apparatus of this embodiment. FIG. 5 is a diagram showing a manner of recording a signal on an information recording medium with another configuration by the recording/reproducing apparatus of this embodiment.

As shown in FIG. 1, with regard to an optical head of the optical information recording/reproducing apparatus of the present invention, a beam splitter 13, a collimator lens 3, a focus/track error signal detecting optical element 8, a mirror 12, a spherical aberration correcting element 9, and an objective lens 4 (comprising combination lens 4a and 4b) are disposed in an optical path from a light source 1 to an information recording medium 11. The light source 1 is a semiconductor laser light source which emits a laser beam having a wavelength of e.g. 0.405 μm, and a laser beam 2 emitted from the light source 1 in the y direction becomes a substantially parallel beam 6 by means of the collimator lens 3 and passes through the focus/track error signal detecting optical element 8 which is diffractive (using first-order diffracted light), and thereafter the optical path is bent in the z direction by means of the mirror 12. Then, the laser beam 6 bent in the z direction passes through the spherical aberration correcting element 9 to be converged onto the information recording medium 11 (a converging light beam 7) by means of the objective lens 4.

The laser beam 7 reflected by the information recording medium 11 turns to the opposite direction and passes through sequentially the objective lens 4, the spherical aberration correcting element 9 and the mirror 12 to be split into a plurality of light beams by means of the diffractive focus/track error signal detecting optical element 8 (using zero-order diffracted light, it is noted that the split light beams are omitted in FIG. 1 for simplification in the optical path from the focus/track error signal detecting optical element 8 to the beam splitter 13). Thereafter, the split light beams are rendered to converging light beams by means of the collimator lens 3 and further deflected in the z direction by means of the beam splitter 13. The resultant plurality of split light beams 17a to 17c pass through respective pinholes 14a to 14c provided on a pinhole array 14, and signals of which are detected by an array of light detectors 10a, 10b and 10c. From these signals, the reproduction signal, and the focus error signal and the track error signal which are servo signals are read out. The signal recorded on the recording medium 11 is read out from the reproduction signal.

A plurality of light beams split by the focus/track error signal detecting optical element 8 which is an optical splitting element are detected by the light detector 10a, 10b and 10c, and thereby the focus error signal and the track error signal are generated as well as the reproduction signal. Based on each of error signals, it is determined whether the focus position (position in z direction) or the track position (position in x or y direction) of the objective lens 4 to the recording medium 11 is optimum. If deviating from the optimum position, the objective lens 4 is moved to the optimum position by an actuator (not shown) mounted on the objective lens 4.

At that time, an interface of the recording member 11*b* of the recording medium 11 may be used as the reference position for controlling the focus, and thus the focus position of the objective lens 4 can be controlled accurately. The interface of the recording member 11*b* may be a boundary face between the substrate 11*a* and the recording member 11*b*, or a surface of the recording member 11*b* facing the objective lens 4.

The pinhole array 14 is located so that the pinholes are positioned at approximately focus points of the split light beams 17*a* to 17*c*, however separate pinholes may be located in the positions corresponding to the focus points of the blanched light beams 17*a* to 17*c*. By making the sizes of the pinholes smaller than the respective converging light beams 17*a* to 17*c*, only the light in the center of each converging light beam 17*a* to 17*c* can be detected. Thus, it is possible to remove unnecessary high-order aberration light distributed in the vicinity of the blanched light beams 17*a* to 17*c* and to improve not only the S/N of a reproduction signal but also the S/N of an error signal of the servo control. Although in this case the amount of light decreases as a result of deleting the light in the periphery of the blanched light beams 17*a* to 17*c*, using an APD (avalanche photodiode) can increase the signal intensity. With regard to an apparatus for recording/reproducing bit information in a three-dimensional arrangement, use of the APD is effective since the amount of detected light cannot be so large because of the limitation in material.

Furthermore, the same effect can be obtained when the aforementioned split light beams 17*a* to 17*c* are detected by the light detectors 10*a* to 10*c* with smaller areas than the respective split light beams 17*a* to 17*c* in place of the pinhole array 14. Furthermore, only the split light beams 17*b* and 17*c* corresponding to a track error signal may be passed through the pinholes 14*b* and 14*c* of the pinhole array 14 so as to be detected by the light detectors 10*b* and 10*c*, while the split light beam 17*a* corresponding to a focus error signal may be directly detected by, for example, the optical detector 10*a* having four divided parts, without passing through the pinhole. With such an arrangement, an astigmatism method, for example, can be used as a method for detecting a focus. Furthermore, in this case, making the area of the light detector 10*a* smaller than the cross section area of the split light beam 17*a* at the detection point allows high-order aberration to be reduced.

In the present embodiment, the objective lens 4 is configured by a pair of lenses 4*a* and 4*b*, and has a high numerical aperture NA more than 0.7 (for example, 0.85). The high numerical aperture is advantageous to improving recording density on the plane (xy-plane) and reducing an interval of bits 5 in z direction to increase recording density. Furthermore, as the information recording medium 11, a substrate 11*a* having a thickness, e.g., of 600 μm is used in combination with a recording member 11*b* having a thickness which is larger than the wavelength, e.g. several tens to several hundreds μm. Though the substrate is formed, e.g. of polycarbonate, resins such as PMMA, glass and the like are also useful. Furthermore, as the recording member 11*b*, those having optical constants such as refractive index which vary in accordance with the light intensity are used. For example, photo refractive crystals such as photopolymers, organic pigments and LiNbO3, multiphoton absorbing materials such as heavy chromic gelatin and diallylethene, and the like are useful. In the present embodiment, for example, a photopolymer is used of which refractive index rises in response to light irradiation.

Furthermore, as shown in FIG. 2, though the surface of the recording member 11*b* formed on the substrate 11*a* is in an exposed state because no protecting layer is formed thereon, the recording member 11*b* is sufficiently thicker than the wavelength so that the surface thereof can be used as a protecting layer. This simple configuration can reduce the cost. Furthermore, as shown in FIG. 5, when the recording member 11*b* is further combined with another protecting medium like a resin film having a thickness of several tens to several hundreds μm to form a sandwich structure, environment-resistance and surface accuracy of the information recording medium 11 can be further improved.

As shown in FIG. 2, by irradiating the recording member 11*b* of the information recording medium 11 with the converging light beam 7, the refractive index of the focal point increases, thereby an information bit 5 is recorded (in FIG. 2, only already-recorded information bits are represented by gray circles). In the present embodiment, however, the converging light beam 7 of the objective lens 4 records sequentially information bits in a three-dimensional arrangement in the recording member 11*b* such that the converging light beam 7 does not pass through the already-recorded information bits.

Concretely, the aforementioned recording can be realized by recording sequentially the information bits from locations in the recording member 11*b* farthest from the objective lens 4. In the configuration of FIG. 2, recording may be conducted in a three-dimensional arrangement in the −Z direction in the order of the row of 15*a*, the row of 15*b* and the row of 15*c*. At this time, the thickness of the recording member 11*b* through which the converging light beam 7 passes varies with the recording depth. Therefore, it is possible to form the information bits 5 preferably by recording the information bits while controlling the spherical aberration amount by means of the spherical aberration correcting element 9 provided in the optical path between the light source 1 and the objective lens 4 in accordance with the recording depth of the information bit 5 to be recorded into the recording member 11*b*. The spherical aberration correcting element 9 can be configured by a liquid crystal element of which distribution of refractive index is variable and a beam expander of which optical axis length is variable by an actuator.

Furthermore, in case that data is recorded in an unrecorded portion in which information bits have not been recorded yet, the direction of recording order to suppress the amount of aberration may not be usually in the −z axial direction insofar when the converging light beam 7 does not pass through the already-recorded information bits.

Figure 3A:
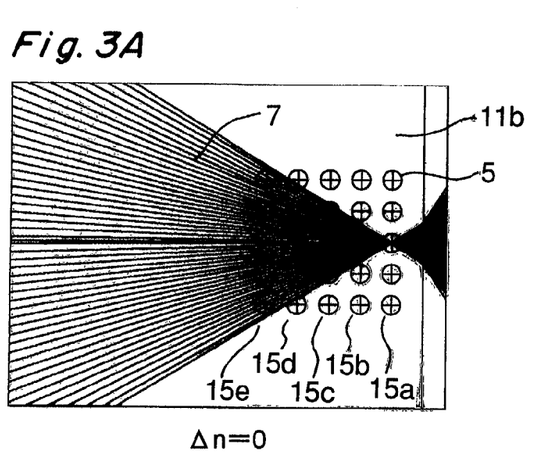
FIGS. 3A to 3C are diagrams of light beam trace for various magnitudes of refractive index of information bit to be recorded on the information recording medium by the recording/reproducing apparatus of the first embodiment of the present invention.
Figure 3B:
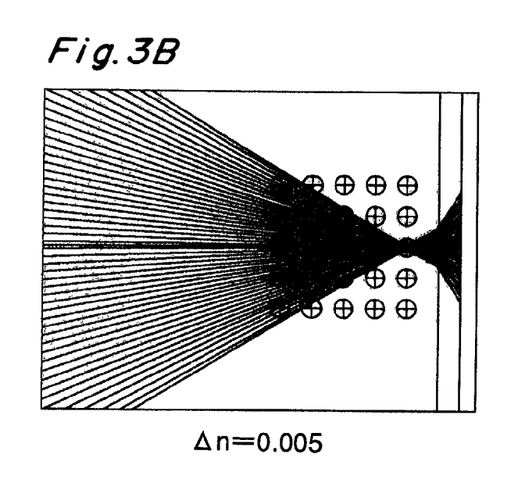
Figure 3C:
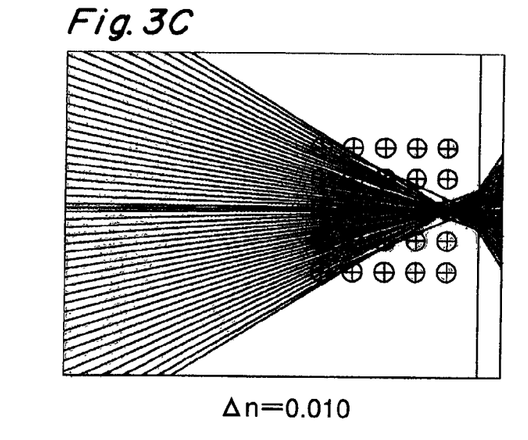
Figure 4A:
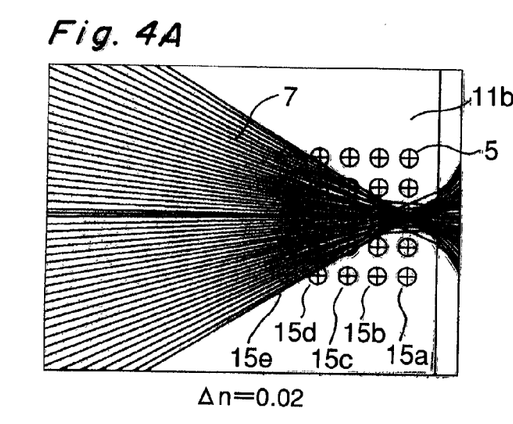
FIGS. 4A to 4D are diagrams of light beam trace for various magnitudes of refractive index of information bit to be recorded on the information recording medium by the recording/reproducing apparatus of the first embodiment of the present invention.
Figure 4B:
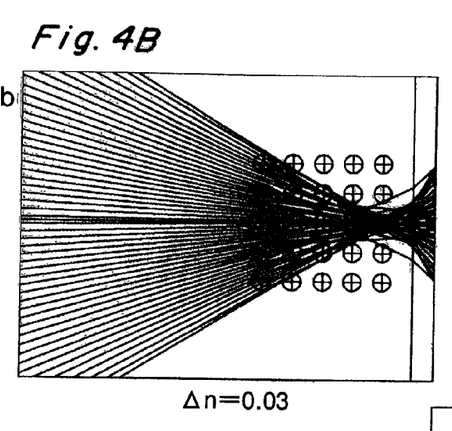
Figure 4C:
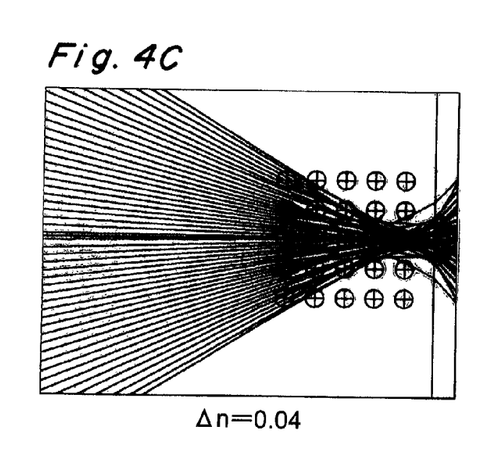
Figure 4D:
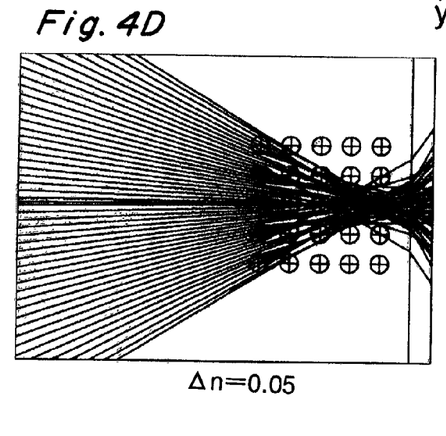

Next, relationship between magnitude of refractive index of an information bit to be recorded into the recording member 11*b* of the information recording medium 11 and degree of occurrence of aberration of the converging light beam 7 will be described. The description will be made assuming the case where, for example, four rows 15*b* to 15*e* of information bits 5 have been recorded in the z direction and in front of the information bit 15*a* to be recorded or read, as shown in FIGS. 3A to 3C. FIG. 3A shows the case in which the change amount of refractive index Δn of a refracting sphere which is to be an information bit is zero (it corresponds to unrecorded state), and the converging light beam 7 is desirably converged. To the contrary, as shown in FIGS. 3B and 3C and FIGS. 4A to 4D, as the magnitude of the change amount Δn of the refracting sphere increases, the spread of the light beam at the focus point increases. The spread of the light beam at the focal point results in a defocus, which requires recording power at the recording and increases the size of the recording information bits, so that the recording characteristic is deteriorated. At the reproduction, the S/N of the reproduction signal tends to be lowered to deteriorate the quality. However, the deterioration of the production signal can be prevented by a configuration as described above which removes high-order aberration by pinholes provided in front of the light detectors.

As described above, the inventors of the present invention have found that, by recording sequentially the information bits into the recording member 11b in a three-dimensional arrangement in such an order that the converging light beam 7 of the objective lens 4 does not pass through the already-recorded information bits, the phenomenon of defocus does not occur and an excellent recording can be obtained. The inventors also have found that the defocus in the recording is within an allowable range under conditions in which the change amount Δn in refractive index of the refracting sphere 5 representing an information bit is less than or equal to 0.02 and in which the information bits are sequentially recorded into the recording member 11b in a three-dimensional arrangement such that the number of rows of information bits which have been already recorded and through which the converging light beam 7 from the objective lens 4 passes is not more than 4 in the direction of optical axis (z direction). This can be explained by the fact that, at Δn=0.02 in FIG. 4A, the light beam at the focus point does not pass through the neighboring refracting spheres.

Furthermore, as the magnitude of Δn decreases, occurrence of aberration is suppressed, whereas the detection light amount is reduced. The inventors of the present invention have found that if Δn is more than or equal to 0.005, the S/N substantially falls in the range that will not cause a problem. Also in this case, the light detector is preferably an APD.

Second Embodiment

Figure 6:
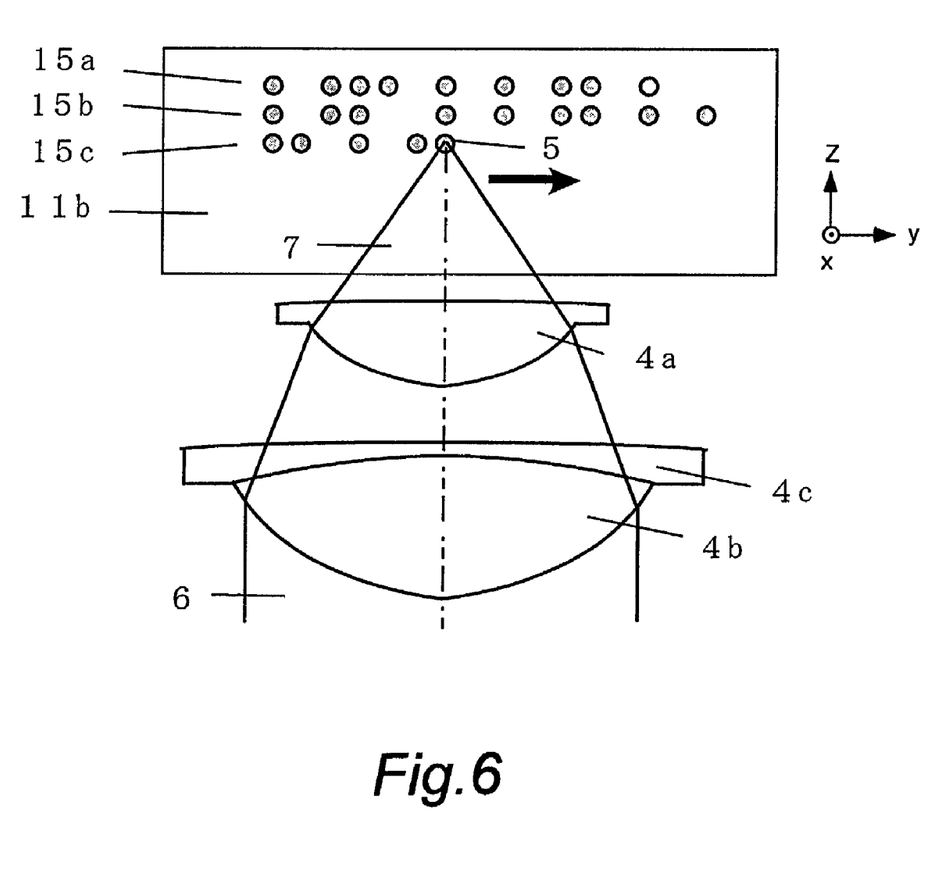
FIG. 6 is a diagram showing the manner of recording a signal on an information recording medium by the optical information recording/reproducing apparatus of the second embodiment of the present invention.

Next, an optical information recording/reproducing apparatus of the second embodiment of the present invention will be described with reference to FIG. 6, mainly for points different from those of the above described first embodiment. FIG. 6 is an explanatory view showing a manner of recording a signal on an information recording medium by the optical information recording/reproducing apparatus of the second embodiment of the present invention.

In the optical information recording/reproducing apparatus of the present embodiment, wavelength λ emitted from the light source substantially satisfies a range 0.35 μm=λ=0.45 μm, and the optical system including the objective lens 4 is configured to be achromatic. In particular, since the dispersion of materials of the optical system tends to be large in the wavelength range, the achromatic configuration can provide desirable optical characteristics. In the present embodiment, the objective lens 4 has an achromatic configuration including a set of three lenses 4a to 4c which are convex, concave and convex lenses. However, the achromatic configuration may be realized by the collimator lens consisting of a set of two convex and concave lenses or a set of three convex, concave and convex lenses, or by another other optical system. Furthermore, the information recording medium 11 consists only of the recording member 11b, thereby providing an advantage in a cost because of the simple structure.

Third Embodiment

Figure 7:
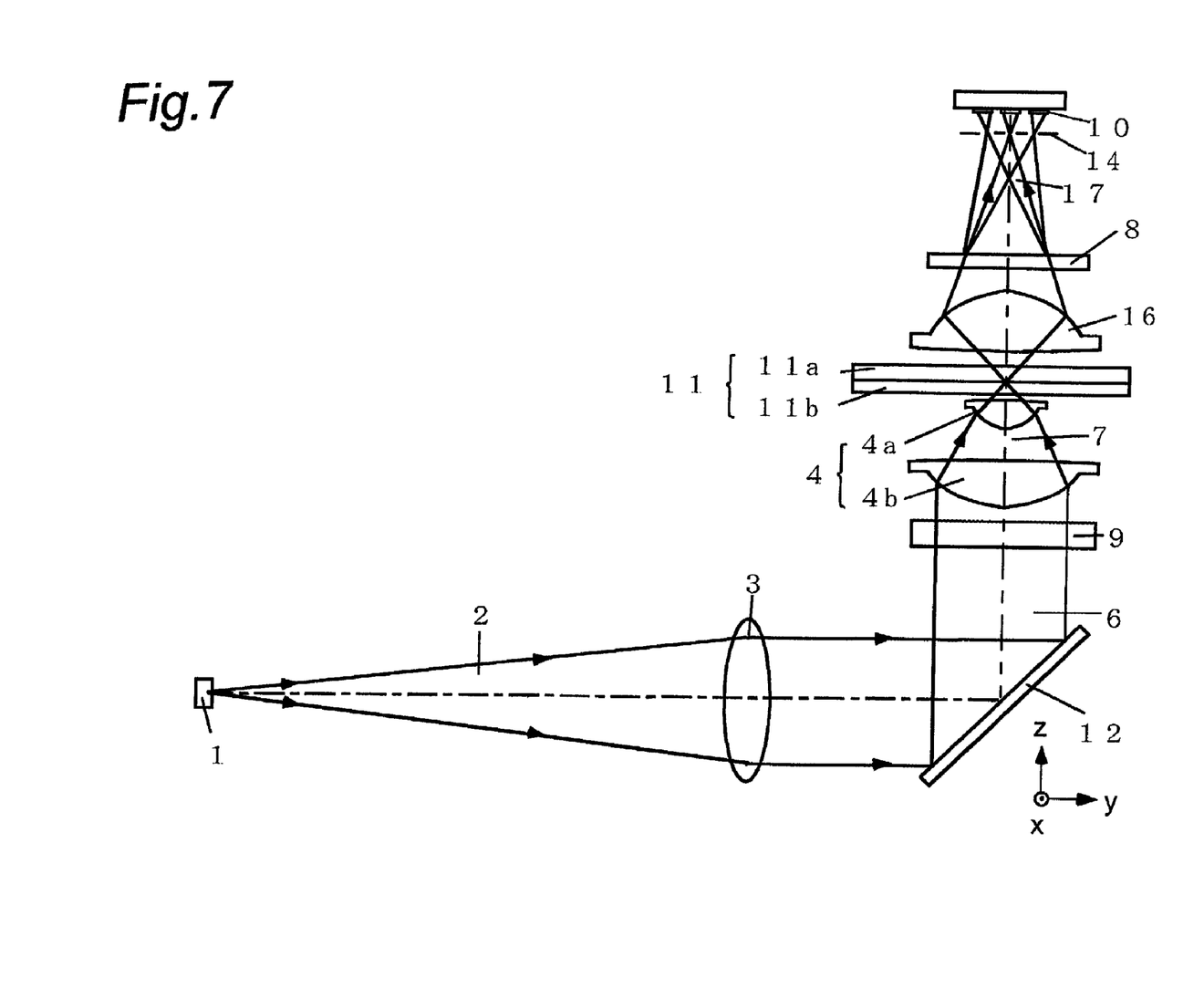
FIG. 7 is a side view showing a basic configuration of an optical head of an optical information recording/reproducing apparatus in the third embodiment of the present invention, in which a light transmission path is also shown.

Next, an optical information recording/reproducing apparatus of the third embodiment of the present invention will be explained with reference to FIG. 7, mainly for points different from those of the aforementioned first embodiment. FIG. 7 is an explanatory view showing a manner of recording a signal on an information recording medium by the optical information recording/reproducing apparatus of the third embodiment of the present invention. The present embodiment uses the information recording medium 11 of the transmission type, as shown in FIG. 7.

The converging light beam 7 from the objective lens 4 converges to the information recording medium 11 of the transmission type to record or reproduce a signal. Then the light beam is converged by the condenser lens 16 which is disposed on one side of the information recording medium 11 opposite to the objective lens 4, and is detected by the light detector 10 via the focus/track error signal detecting optical element 8 and the pinhole array 14.

With the configuration of the transmission type, the converging light beam 7 passes through the recording member 11b only once (twice in the case of the recording/reproducing apparatus of the reflection type according to the first embodiment), so that occurrence of aberration from the already-recorded information bits is about half of the case adopting reflection detection. Hence the quality of reading the signal can be improved compared to the optical information recording/reproducing apparatus of the reflection type according to the first embodiment.

While the optical information recording/reproducing apparatuses according to the first to third embodiments of the present invention have been explained, it is to be understood that the present invention is not limited to these embodiments, and optical information recording/reproducing apparatuses in which configurations of the respective optical information recording/reproducing apparatuses are combined also involved in the present invention, which provide the same effect. Furthermore, the optical information recording apparatus also includes a re-writable type apparatus in addition to a recordable type apparatus. Also, the objective lens and the collimator lens used in the above description are referred to for convenience, and are synonymous with general lens.

Furthermore, in the above embodiments, the explanation was made while taking the optical disc as an example, however, applying to products in the forms of card, drum and tape which are designed to be capable of reproducing a plurality of mediums having different specifications such as thickness and recording density by the similar information recording/reproducing apparatus is also within the scope of the invention.

As described above, the present invention relates to an optical information recording/reproducing apparatus for recording information bits in a three-dimensional arrangement which does not apply a converging light beam from the objective lens to already-recorded information bits, and thus an optical information recording/reproducing apparatus capable of desirably recording can be achieved.

Although the present invention has been described in connection with specified embodiments thereof, many other modifications, corrections and applications are apparent to those skilled in the art. Therefore, the present invention is not limited by the disclosure provided herein but limited only to the scope of the appended claims.

It is noted that this application is based on application No. 2000-354486 filed in Japan, the contents of which is herein incorporated by reference.

What is claimed is:

1. An optical information recording and reproducing apparatus for recording information bits into an information recording medium having a recording member into which information bits are recorded in a three-dimensional arrangement by changing an optical constant of the recording member of the recording medium, the apparatus comprising:
   a light source that emits a light beam;
   an objective lens that converges the light beam emitted from the light source to an the information recording medium; and
   a light detector that detects the light beam from the information recording medium,
   wherein a thickness of the recording member is larger than a wavelength of the light beam, and
   the information bits are sequentially recorded into the recording member in a three-dimensional arrangement such that a converging light beam from the objective lens does not pass through information bits that have already been recorded.

2. The apparatus according to claim 1, wherein the information bits are sequentially recorded from the farthest points from the objective lens in the recording member.

3. The apparatus according to claim 1, wherein the objective lens comprises a lens of which numerical aperture is more than or equal to 0.7, and pinholes are disposed in an optical path including the objective lens and the light detector such that the light beam from the information recording medium is detected by the light detector after passing through the pinholes.

4. The apparatus according to claim 1, further comprising a focus/track error signal detecting optical element which is an optical splitting element and disposed in an optical path including the objective lens and the light detector, and a pinhole array having a plurality of pinholes and disposed in the optical path,
   wherein the light beam from the information recording medium is split into a plurality of light beams by means of the focus/track error signal detecting optical element, and the plurality of light beams are detected by the light detector after passing through corresponding pinholes of the pinhole array.

5. The apparatus according to claim 1, further comprising a focus/track error signal detecting optical element disposed in an optical path including the objective lens and the light detector,
   wherein the light beam from the information recording medium is split into a plurality of light beams by means of the focus/track error signal detecting optical element, and each split light beam is detected by the light detector having an area smaller than that of each of the split light beams.

6. The apparatus according to claim 1, further comprising a focus/track error signal detecting optical element disposed in an optical path including the objective lens and the light detector, and a pinhole array having a plurality of pinholes and disposed on the optical path,
   wherein the light beam from the information recording medium is split into a plurality of light beams by means of the focus/track error signal detecting optical element, and the light beams corresponding to track error signals are detected by the light detector after passing through pinholes of the pinhole array.

7. The apparatus according to claim 1, wherein the wavelength $\lambda$ of the light beam emitted from the light source substantially is in a range satisfying $0.35\ \mu m \leq \lambda \leq 0.45\ \mu m$, and the optical system including the objective lens is configured to be achromatic.

8. The apparatus according to claim 1, further comprising a spherical aberration correcting element disposed in an optical path including the light source and the objective lens, wherein the spherical aberration correcting element controls an amount of spherical aberration in accordance with a recording depth of the information bits to be recorded into the recording member.

9. The apparatus according to claim 1, wherein the optical constant is a refractive index.

10. The apparatus according to claim 9, wherein an amount of the change in refractive index is more than or equal to 0.005.

11. The apparatus according to claim 1, wherein the information recording medium comprises one and only one recording member.

12. The apparatus according to claim 1, wherein the information recording medium comprises the recording member and a substrate.

13. The apparatus according to claim 1, wherein the information recording medium is configured by the recording member sandwiched between a substrate and a protecting member.

14. The apparatus according to claim 1, wherein the light detector comprises an avalanche photodiode.

15. The apparatus according to claim 1, further comprising a condenser lens disposed on one side of the information recording medium opposite to the objective lens, the condenser lens converging the light beam from the information recording medium to the light detector to detect the light beam.

16. The apparatus according to claim 1, wherein a focus position of the objective lens is controlled with reference to an interface of the recording member of the recording medium.

17. The apparatus according to claim 1, wherein the recording member is a single recording layer.

18. An optical information recording and reproducing apparatus for recording information bits into an information recording medium having a recording member into which information bits are recorded in a three-dimensional arrangement by changing a refractive index of the recording member of the recording medium, the apparatus comprising:
   a light source that emits a light beam;
   an objective lens that converges the light beam emitted from the light source to the information recording medium; and
   a light detector that detects a light beam from the information recording medium,
   wherein a thickness of the recording member is larger than a wavelength of the light beam,
   wherein an amount of the change in refractive index is less than or equal to 0.02, and
   wherein the information bits are recorded sequentially into the recording member in a three-dimensional arrangement such that the number of rows of information bits which have been already recorded in the direction of optical axis is not more than 4.

19. The apparatus according to claim 18, wherein the objective lens comprises a lens of which numerical aperture is more than or equal to 0.7, and pinholes are disposed in an optical path including the objective lens and the light detector such that the light beam from the information recording medium is detected by the light detector after passing through the pinholes.

20. The apparatus according to claim 18, further comprising a focus/track error signal detecting optical element which is an optical splitting element and disposed in an optical path including the objective lens and the light detector, and a pinhole array having a plurality of pinholes and disposed in the optical path, wherein the light beam from the information recording medium is split into a plurality of light beams by means of the focus/track error signal detecting optical element, and the plurality of light beams are detected by the light detector after passing through corresponding pinholes of the pinhole array.

21. The apparatus according to claim 18, further comprising a focus/track error signal detecting optical element disposed in an optical path including the objective lens and the light detector, wherein the light beam from the information recording medium is split into a plurality of light beams by means of the focus/track error signal detecting optical element, and each split light beam is detected by the light detector having an area smaller than that of each of the split light beams.

22. The apparatus according to claim 18, further comprising a focus/track error signal detecting optical element disposed in an optical path including the objective lens and the light detector, and a pinhole array having a plurality of pinholes and disposed on the optical path, wherein the light beam from the information recording medium is split into a plurality of light beams by means of the focus/track error signal detecting optical element, and the light beams corresponding to track error signals are detected by the light detector after passing through pinholes of the pinhole array.

23. The apparatus according to claim 18, wherein the wavelength λ of the light beam emitted from the light source substantially is in a range satisfying 0.35 μm≦λ≦0.45 μm, and the optical system including the objective lens is configured to be achromatic.

24. The apparatus according to claim 18, further comprising a spherical aberration correcting element disposed in an optical path including the light source and the objective lens, wherein the spherical aberration correcting element controls an amount of spherical aberration in accordance with a recording depth of the information bits to be recorded into the recording member.

25. The apparatus according to claim 18, wherein the information recording medium comprises one and only one recording member.

26. The apparatus according to claim 18, wherein the information recording medium comprises the recording member and a substrate.

27. The apparatus according to claim 18, wherein the information recording medium is configured by the recording member sandwiched between a substrate and a protecting member.

28. The apparatus according to claim 18, wherein the light detector comprises an avalanche photodiode.

29. The apparatus according to claim 18, further comprising a condenser lens disposed on one side of the information recording medium opposite to the objective lens, the condenser lens converging the light beam from the information recording medium to the light detector to detect the light beam.

30. The apparatus according to claim 18, wherein a focus position of the objective lens is controlled with reference to an interface of the recording member of the recording medium.

31. The apparatus according to claim 18, wherein the recording member is a single recording layer.

* * * * *

UNITED STATES PATENT AND TRADEMARK OFFICE
CERTIFICATE OF CORRECTION

| | | |
|---|---|---|
| PATENT NO. | : 7,038,978 B2 | Page 1 of 1 |
| APPLICATION NO. | : 09/988788 | |
| DATED | : May 2, 2006 | |
| INVENTOR(S) | : Teruhiro Shiono et al. | |

It is certified that error appears in the above-identified patent and that said Letters Patent is hereby corrected as shown below:

Column 9, line 16, "from the light source to an the information recording" should read --from the light source to the information recording--.

Signed and Sealed this

Twenty-second Day of August, 2006

JON W. DUDAS
*Director of the United States Patent and Trademark Office*